United States Patent [19]

Matsumoto

[11] Patent Number: 4,976,330
[45] Date of Patent: Dec. 11, 1990

[54] VEHICLE TRACTION CONTROL SYSTEM FOR PREVENTING VEHICLE TURNOVER ON CURVES AND TURNS

[75] Inventor: Renpei Matsumoto, Tokyo, Japan

[73] Assignee: Fuji Jukogyo Kabushiki Kaisha, Tokyo, Japan

[21] Appl. No.: 280,437

[22] Filed: Dec. 6, 1988

[30] Foreign Application Priority Data

Dec. 22, 1987 [JP] Japan .................. 62-326083

[51] Int. Cl.$^5$ .......... B60K 31/00; B60T 8/18
[52] U.S. Cl. ........................ 180/197; 303/96; 303/100; 364/426.02
[58] Field of Search ............ 180/197; 303/96, 97, 303/100, 106; 364/426.03, 426.02, 426.04

[56] References Cited

U.S. PATENT DOCUMENTS

| 3,938,612 | 2/1976 | Boudeville et al. | 180/197 |
| 4,647,115 | 3/1987 | Leiber et al. | 303/106 |
| 4,765,430 | 8/1988 | Schulze et al. | 303/97 |
| 4,779,202 | 10/1988 | Leiber | 180/197 X |
| 4,809,183 | 2/1989 | Eckert | 364/426.02 |
| 4,843,552 | 6/1989 | Inagaki | 364/426.03 |
| 4,850,446 | 7/1989 | Leiber et al. | 180/197 |

FOREIGN PATENT DOCUMENTS

| 295396 | 12/1988 | European Pat. Off. | 180/197 |
| 2818813 | 11/1979 | Fed. Rep. of Germany | 180/197 |
| 2832739 | 2/1980 | Fed. Rep. of Germany | 180/197 |
| 38034 | 2/1988 | Japan | 180/197 |

Primary Examiner—Mitchell J. Hill
Attorney, Agent, or Firm—Beveridge, DeGrandi & Weilacher

[57] ABSTRACT

A traction control system comprising a slip control circuit connected between a slip detector circuit and a hydraulic brake control mechanism. Normally, the slip control circuit acts to cause the brake control mechanism to controllably actuate brakes on vehicle wheels so as to maintain the slip rates of the wheels less than a predetermined limit. The slip control circuit is disabled, however, by a wheel liftoff detector circuit as the latter detects, when the vehicle is rounding a curve, the lifting of the inside wheels off the road surface. At the same time the wheel liftoff detector circuit causes a decrease in engine power through reduction of throttle opening, thereby minimizing the danger of vehicle turnover.

4 Claims, 2 Drawing Sheets

VEHICLE TRACTION CONTROL SYSTEM FOR PREVENTING VEHICLE TURNOVER ON CURVES AND TURNS

BACKGROUND OF THE INVENTION

This invention relates generally to traction control systems for motor vehicles whereby the tractive forces of the vehicle wheels are automatically controlled so as to prevent wheelspin. More specifically, the invention pertains to a traction control system relying on wheel brakes for traction control and featuring provisions for precluding the possibility of vehicle turnover when the vehicle is running on a curve.

Vehicle traction control in response to the rate of wheelspin is per se not new in the art. Generally, in this type of traction control system, vehicle traction is so controlled as to limit the slip of the drive wheels at a rate (So in FIG. 3 of the drawings attached hereto) where the driving force and lateral force are equally high. The possibility of wheelspin when the vehicle is steered in either direction is thus reduced by assuring the high lateral force without substantially sacrificing the propelling force.

A problem has been encountered in connection with systems relying on wheel brakes for traction control. When the vehicle makes a sharp turn, with the consequent lifting of the inner wheels off the road surface, the conventional traction control system has operated to brake the wheels that are about to spin. Then the differentials included in the vehicle drive line will cause a rapid increase in the engine power transmitted to the outer wheels which are in contact with the road surface. Thus, with its inside wheels braked and its outside wheels subjected to greater driving forces, the vehicle in turns has been exposed to the possibility of rolling over.

U.S. Pat. No. 3,893,535 and Japanese Patent Laid-Open Publication No. 62-87630 represent examples of prior art traction control systems. These prior art systems are similar in that, upon detection of wheelspin, the engine output torque is automatically decreased to overcome the wheelspin. The cited Japanese Patent Laid-Open Publication further teaches to inhibit the reduction of engine power at low vehicle speed in order to prevent the possibility that the vehicle may become incapable of starting up because of the spinning of only one drive wheel. However, both prior art systems are silent on the subject of the possibility of vehicle rollover in turns.

The above noted problem has remained unsolved with traction control system incorporating wheel brakes. The prevention of vehicle turnover requires accurate and quick detection of inside wheel liftoff and the immediate overriding of the normal traction control and engine power control.

SUMMARY OF THE INVENTION

The present invention provides a novel traction control system of the class employing wheel brakes for the prevention of wheelspin, so made that the impending possibility of vehicle turnover on full spared condition of cornering is positively prevented through detection of inside wheel liftoff.

Briefly, the traction control system of the invention is intended for a motor vehicle of the type having a set of wheels, a set of brakes provided one on each wheel, brake control means for controlling the braking forces exerted by the brakes on the respective wheels, and throttle control means for controllably varying engine power in response to accelerator displacement. The traction control system comprises slip detector means for detecting the actual slip rates of the vehicle wheels, and slip control means connected between the slip detector means and the brake control means for causing the latter to controllably actuate the brakes so as to maintain the slip rates of the wheels less than a prescribed limit. Also included in the traction control system are wheel liftoff detector means for detecting, when the vehicle is taking a curve, the lifting of the inside wheels of the vehicle off the road surface. The wheel liftoff detector means are connected to the slip control means for disabling the same upon detection of inside wheel liftoff, and to the throttle control means for decreasing the engine power to a predetermined degree upon detection of inside wheel liftoff.

In a preferred embodiment disclosed herein, in which the invention is adapted for a four wheel drive vehicle, the traction control system normally operates to maintain the slip of the drive wheels at not more than a rate at which the propelling force and lateral force are both sufficiently high to assure steering stability. Upon detection of inside wheel liftoff in turns, the traction control system abandons braking traction control, leaving the inside drive wheels spinning. At the same time the traction control system causes a decrease in engine output torque being transmitted to the outside drive wheels, which of course remain in contact with the ground surface, to an extent necessary to eliminate the danger of turnover.

The above and other features and advantages of the invention and the manner of realizing them will become more apparent, and the invention itself will best be understood, from a study of the following description and appended claims, with reference had to the attached drawings showing the preferred embodiment of the invention.

DESCRIPTION OF THE PREFERRED EMBODIMENT

Figure 1:
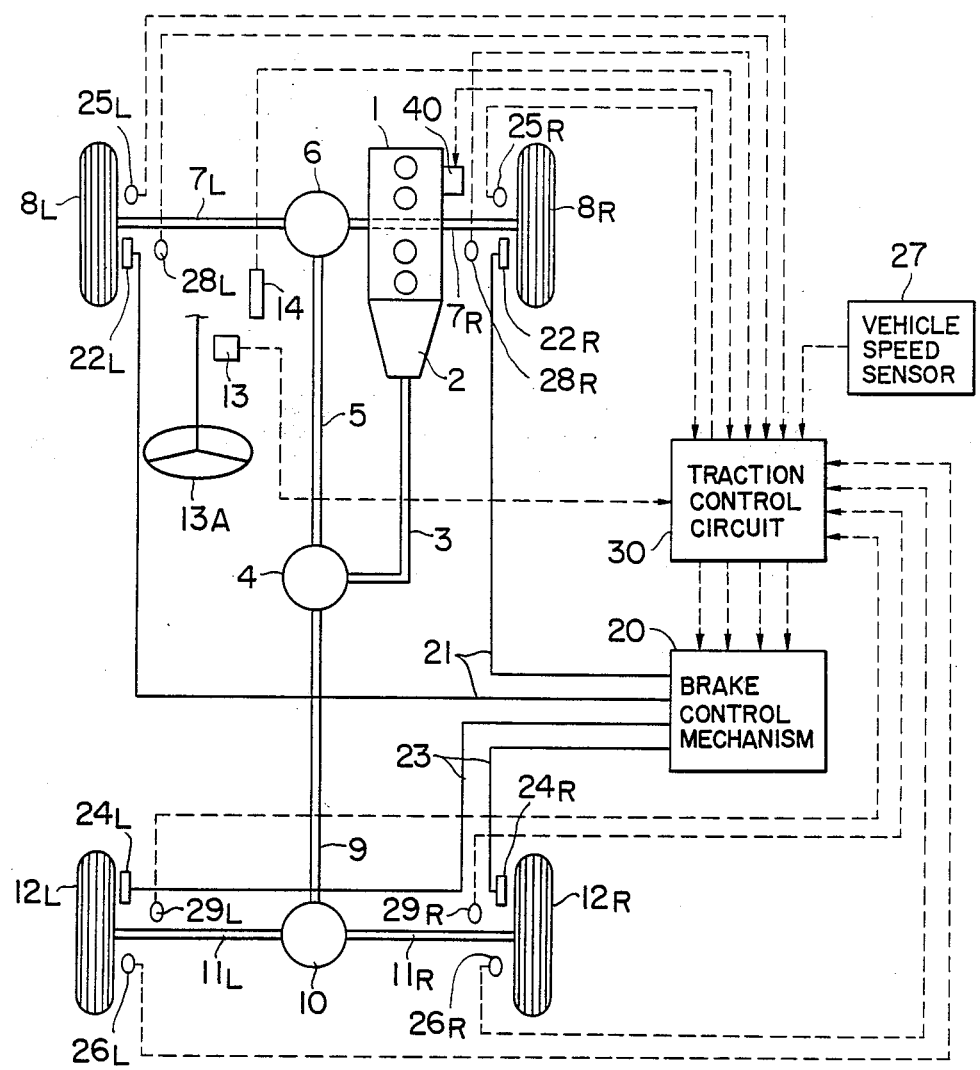
FIG. 1 is a diagrammatic representation of the traction control system of the invention as incorporated with a four wheel drive motor vehicle by way of example.

The traction control system of the invention will now be described in detail in the environment of a front engine, four wheel drive motor vehicle illustrated in FIG. 1. Although this illustration is very diagrammatic, it will nevertheless be seen that the vehicle comprises an internal combustion engine 1, operatively connected with a transmission 2, mounted on the vehicle. The output shaft 3 of the transmission 2 is coupled to a center differential 4. This center differential is coupled, on the one hand, to a front differential 6 via a front propeller shaft 5 and thence to a front pair of drive wheels 8L and 8R via front drive axles or shafts 7L and 7R. On the other hand, the center differential 4 is connected to a rear differential 10 via a rear propeller shaft 9 and thence to a rear pair of drive wheels 12L and 12R via rear drive axles or shafts 11L and 11R.

FIG. 1 also shows the layout of a hydraulic brake system incorporated with the vehicle. The brake system is shown as being of the independent four wheel braking variety including a brake pressure control mechanism 20. This brake pressure control mechanism communicates with a pair of front wheel brakes 22L and 22R via separate brake fluid lines or conduits 21, and with a pair of rear wheel brakes 24L and 24R via separate brake fluid lines or conduits 23. The brake pressure control mechanism 20 can be of any known or suitable design capable of responding to electric brake control signals for independently controlling the fluid pressures on the four wheel brakes 22L, 22R, 24L and 24R, and hence the braking forces on the four wheels 8L, 8R, 12L and 12R. The brake control signals are supplied from a traction control circuit 30, enabling the brake pressure control mechanism 20 to control the brakes so as to prevent wheelspin in the manner set forth hereafter.

Forming parts of the traction control system in accordance with the invention are four wheel speed sensors 25L, 25R, 26L and 26R associated with the respective vehicle wheels 8L, 8R, 12L and 12R. The wheel speed sensors generate electric signals representative of the rotating speeds of the vehicle wheels. These signals, hereinafter referred to as the wheel speed signals, are fed to the traction control circuit 30.

The traction control system further comprises a vehicle speed sensor 27 electrically coupled to the traction control circuit 30 for delivering thereto an electric signal, hereinafter referred to as the vehicle velocity signal, indicative of the traveling speed of the vehicle. The vehicle speed sensor 27 may produce the vehicle velocity signal either by integrating the output signal of an acceleration sensor mounted to the vehicle or by computing the mean value of the four wheel speeds represented by the wheel speed signals.

Further, for the detection of wheel liftoff, the traction control system employs a set of wheel stroke sensors 28L, 28R, 29L and 29R which are provided for the wheels 8L, 8R, 12L and 12R, respectively. Additionally, the traction control system comprises a steering angle sensor 13 on the vehicle steering system including a steering wheel 13A, and an accelerator pedal depression sensor 14 associated with the accelerator pedal, not shown, of the vehicle. As the names imply, the steering angle sensor 13 produces a signal indicative of the angle through which the steering wheel 13A is turned in either direction, and the accelerator sensor 13 produces a signal indicative of the degree to which the accelerator pedal is depressed. The output signals of all these sensors 13, 14, 28L, 28R, 29L and 29R are also fed to the traction control circuit 30.

In response to the signals supplied by the various sensors set forth in the foregoing, the traction control circuit 30 generates the brake control signals and delivers them to the brake pressure control mechanism 20 for traction control. Also, the traction control circuit 30 generates a throttle control signal for delivery to a throttle motor 40 on the engine 1 for the control of throttle opening and, in consequence, of engine output torque.

Figure 2:
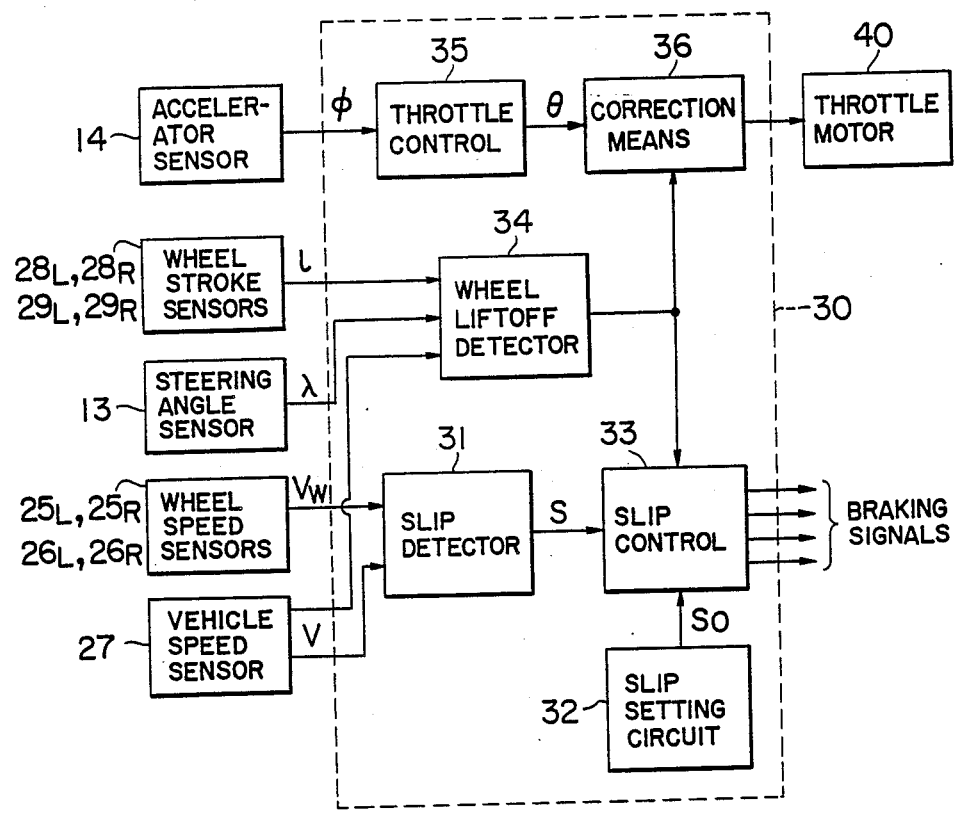
FIG. 2 is a block diagram of the electrical circuitry included in the traction control system of FIG. 1.

FIG. 2 is a block diagrammatic representation of the details of the traction control circuit 30, shown together with the various sensors set forth in the foregoing. The traction control circuit 30 includes, first of all, a slip detector circuit 31 to which there are connected the four wheel speed sensors 25L, 25R, 26L and 26R and the vehicle speed sensor 27. Inputting the wheel speed signals Vw and vehicle velocity signal V from these sensors, the slip detector circuit 31 computes the actual slip rate of each wheel. The resulting actual slip rate signals S are supplied to a slip control circuit 33.

Figure 3:
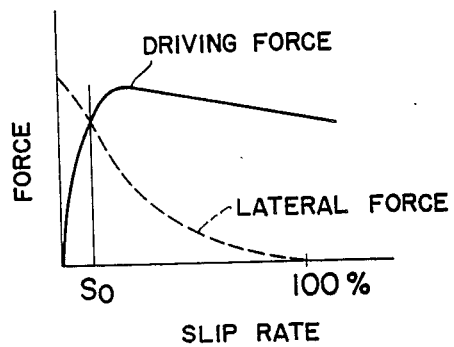
FIG. 3 is a graph useful in explaining how the permissible slip rate of the drive wheels of the vehicle is determined in the traction control system of FIG. 1.

Also coupled to the slip control circuit 33 is a slip rate setting circuit 32 which puts out a signal representative of a desired wheel slip rate So indicated in FIG. 3. It will be noted from this graph that the propelling force and the lateral force are equally high at this permissible slip rate. The slip control circuit 33 constantly compares each actual slip rate signal S with the permissible slip rate signal So. Whenever the actual slip rate of any wheel exceeds the permissible slip rate, the slip control circuit 33 produces a braking signal corresponding to the difference between the actual and permissible slip rates. Impressed to the brake pressure control mechanism 20, the braking signal causes the same to apply the brake on the wheel in question to an extent necessary to decrease its actual slip rate to the permissible slip rate.

The traction control circuit 30 further comprises a wheel liftoff detector circuit 34 to which there are coupled all of the four wheel stroke sensors 28L, 28R, 29L and 29R, the steering angle sensor 13, and the vehicle speed sensor 27. The wheel liftoff detector circuit 34 computes the lateral acceleration of the vehicle from the vehicle velocity V and the steering angle λ and compares the thus computed lateral vehicle acceleration with a predetermined reference value. Further the circuit 34 proceeds to determine the occurrence of wheel liftoff when the following two conditions are met at the same time: (1) the lateral vehicle acceleration exceeds the reference value; and (2) the wheel stroke l of at least either of the inside wheels of the vehicle taking a turn also exceeds a predetermined limit.

The wheel liftoff detector circuit 34 has its output coupled to the slip control circuit 33. Upon detection of wheel liftoff, in turns, the slip control circuit 33 abandons braking traction control. At the same time, the output signal of the detector circuit 34 is supplied to the throttle motor 40 through correction means 36 to decrease the output torque of the engine.

Additionally, the traction control circuit 30 comprises a throttle control system including a throttle control circuit 35 to which is connected the noted accelerator sensor 14. As this accelerator sensor 14 supplies the signal φ indicative of the degree of accelerator pedal depression, the throttle control circuit 35 responds by generating a throttle opening signal θ representative of the corresponding degree of throttle opening. Normally, the throttle opening signal θ will be fed directly to the throttle motor 40, causing the same to open the throttle valve to the extent corresponding to the degree of accelerator displacement.

Interposed between the throttle control circuit 35 and the throttle motor 40 is a throttle control correction means 36 under the control of the wheel liftoff detector circuit 34. Upon detection of inside wheel liftoff during vehicle turn, the detector circuit 34 will activate the throttle control correction means 36, causing the same to decrease to a prescribed degree of the throttle opening being represented by the output signal θ of the throttle control circuit 35.

In operation, the output torque of the vehicle engine 1 is fed from the transmission 2 to the center differential 4, which transfers the driving torque to both front propeller shaft 5 and rear propeller shaft 9. The front propeller shaft 5 drives the front pair of wheels 8R and 8L via the front differential 6 and front wheel axles 7R and 7L. The rear propeller shaft 9 similarly drives the rear pair of wheels 12R and 12L via the rear differential 10 and rear wheel axles 11R and 11L. Thus the vehicle travels with all the four wheels driven from the front mounted engine 1.

During such vehicle travel, the four wheel speed sensors 25R, 25L, 26R and 26L will deliver the respective wheel speed signals Vw to the traction control circuit 30. The vehicle speed sensor 27 will also deliver the vehicle velocity signal V to the traction control circuit 30.

At the traction control circuit 30, the slip detector circuits 31 will compute the actual slip rate S of each vehicle wheel in response to the incoming wheel speed signals Vw and vehicle speed signal V. The slip control circuit 33 will compute the actual slip rate S of each wheel with the permissible slip rate So. Whenever the actual slip rate S of any one of wheels exceeds the permissible slip rate So, the slip control circuit 33 will put out the braking signal proportional to the difference between the actual and desired slip rates. The brake pressure control mechanism 20 will respond to this braking signal by actuating the brake on the spinning wheel until its actual slip rate S drops to the permissible slip rate So. Thus, in the absence of inside wheel liftoff, the traction control system will operate in the usual manner to minimize wheelspin.

Also, as the unshown accelerator pedal is depressed, the accelerator pedal depression sensor 14 will supply the signal representative of the degree of accelerator dispalcement to the throttle control circuit 35. The throttle control circuit 35 will then deliver the corresponding throttle opening signal to the throttle motor 40, causing the same to open the unshown throttle valve to the required degree. The output power of the engine 1 will thus be controlled electronically.

Let us suppose that the vehicle is sharply steered and accelerated at the same time, on a dry road surface. Inputting the output signals of the steering angle sensor 13, vehicle speed sensor 27 and wheel stroke sensors 28L, 28R, 29L and 29R, the wheel liftoff detector circuit 34 will ascertain whether the inside wheels of the turning vehicle lift off the road surface or not.

Upon detection of inside wheel liftoff, the detector circuit 34 will control the throttle motor 40 through the correction means 36, allowing possible wheelspin. At the same time the wheel liftoff detector circuit 34 will activate the throttle control correction means 36, which modifies the throttle opening signal being fed from throttle control circuit 35 to throttle motor 40 so as to decrease throttle opening and to reduce engine power. As the power being transmitted to the vehicle wheels in contact with the ground surface is thus reduced, the vehicle will be freed from the possibility of turnover. The vehicle will be automatically placed under normal traction control and throttle control as the possibility of turnover is overcome as a result of the engine power reduction.

Although the traction control system of the invention has been shown and described hereinbefore as adapted for a front engine, four wheel drive vehicle, it is envisaged that the principles of the invention are applicable to vehicles having other types of drive lines including front or rear wheel drives irrespective of engine placement. It is also recognized that the lateral acceleration of the vehicle could be relied upon for the detection of a sharp vehicle turn that might result in inside wheel liftoff and in eventual vehicle turnover. Additional modifications or alterations of the invention may be resorted to without departing from the scope of the invention.

What is claimed is:

1. A traction control system for a motor vehicle having engine with a throttle valve actuated by an actuator means and wheels driven by the engine, accelerator pedal depression degree detector means for detecting degree of acceleration pedal depression and for producing a depression degree signal, throttle control means responsive to the depression degree signal for computing a desired throttle valve opening degree corresponding to the accelerator pedal depression degree and for producing a desired opening degree signal to the actuator means, the traction control system comprising:

wheel stroke detecting means for detecting wheel stroke depending on a vertical movement of each of the wheels and for producing a wheel stroke signal;

wheel lift-off detector means responsive to said wheel stroke signal for determining a wheel lift-off condition when said wheel stroke of either of the wheels exceeds a predetermined value and for producing a wheel life-off signal; and correction means responsive to said wheel lift-off signal and to the desired opening degree signal for decreasing the desired throttle valve opening degree to reduce an output of the engine.

2. The traction control system of claim 1, further comprising:

steering angle detector means for detecting a steering angle and for producing a steering angle signal; and vehicle speed detector means for detecting a vehicle speed and for producing a vehicle speed signal, said wheel lift-off detector means responsive to said wheel stroke signal, said steering angle signal and said vehicle speed signal for determining said wheel lift-off condition during turning of the vehicle.

3. The traction control system of claim 1 wherein the throttle control means comprises:

an accelerator sensor;

a throttle control circuit connected to the accelerator sensor for producing a throttle opening signal in accordance with the degree of accelerator displacement sensed by the accelerator sensor; and a throttle motor for controlling throttle opening in response to the throttle opening signal;

said wheel lift-off detector means further comprising a throttle control correction means connected between the throttle control circuit and the throttle motor, the throttle control correction means being responsive to a signal from said wheel lift-off detector means for causing the throttle motor to decrease throttle opening upon detection of inside wheel lift-off by said wheel lift-off detector means.

4. The traction control system of claim 1, further comprising:

a set of brakes provided on each of the wheels;

brake control means for controlling braking forces exerted by said brakes on respective wheels;

a slip detector for detecting actual slip rates of the wheels;

a slip rate setting circuit for supplying a signal representative of a permissible slip rate of the wheels; and a slip control circuit connected to said slip detector, said slip rate setting circuit, and said brake control means for comparing the actual slip rates with the permissible slip rate and for actuating said brake control means so as to maintain the actual slip rates at not more than the permissible slip rate, said slip control circuit being further connected to said wheel lift-off detector means.

* * * * *